(12) United States Patent
Ortega Garcia et al.

(10) Patent No.: US 10,363,971 B2
(45) Date of Patent: Jul. 30, 2019

(54) ADAPTABLE RETAINER

(71) Applicant: Ford Global Technologies, LLC, Dearborn, MI (US)

(72) Inventors: Edgar Javier Ortega Garcia, Tlalnepantla (MX); Jesus Man Perez Hernandez, Cuahutemoc (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/822,453

(22) Filed: Nov. 27, 2017

(65) Prior Publication Data
US 2019/0161124 A1   May 30, 2019

(51) Int. Cl.
| B62D 25/06 | (2006.01) |
| F16B 5/00 | (2006.01) |
| B62D 27/02 | (2006.01) |
| F16B 5/06 | (2006.01) |

(52) U.S. Cl.
CPC ............ B62D 25/06 (2013.01); B62D 27/02 (2013.01); F16B 5/065 (2013.01); F16B 5/0642 (2013.01); F16B 5/0657 (2013.01)

(58) Field of Classification Search
CPC ...... F16B 5/0642; F16B 5/0657; F16B 5/065; Y10T 24/309; Y10T 24/30
USPC .......................................... 411/546; 296/210
See application file for complete search history.

(56) References Cited

U.S. PATENT DOCUMENTS

| 3,562,852 A * | 2/1971 | Gutshall ................. E05F 1/123 16/225 |
| 4,650,925 A * | 3/1987 | Coldren ................... H02G 3/32 174/135 |
| 4,669,640 A * | 6/1987 | Ando ..................... B65D 5/746 156/69 |
| 5,288,191 A * | 2/1994 | Ruckert ................ F16B 5/0233 403/409.1 |
| 6,857,809 B2 * | 2/2005 | Granata ............. B60R 13/0206 403/121 |
| 8,202,033 B2 * | 6/2012 | Choi .................... B62D 25/147 411/535 |
| 8,876,200 B2 | 11/2014 | Huelke et al. |
| 9,302,716 B2 * | 4/2016 | Sahi ..................... B62D 27/065 |
| 9,428,226 B2 | 8/2016 | Joyce et al. |
| 9,657,807 B2 | 5/2017 | Morris et al. |
| 9,659,012 B2 * | 5/2017 | Thatte .................. G06F 11/3636 |
| 2011/0041299 A1 * | 2/2011 | Onuma ............... B60R 13/0206 24/662 |

* cited by examiner

*Primary Examiner* — Dennis H Pedder
(74) *Attorney, Agent, or Firm* — Vichit Chea; Price Heneveld LLP

(57) ABSTRACT

A vehicle interior substrate attachment system is provided herein. The vehicle interior substrate attachment system includes a fastener coupled to a roof substrate. A retainer is coupled to the fastener and includes a base, a body extending from the base, and an engagement platform defining a receiver to receive the fastener coupled to the body by a hinge feature. The hinge feature is configured to articulate such that the engagement platform is operable between a first position and a second position that is further from the base than the first position. A liner substrate is coupled to the base of the retainer.

11 Claims, 5 Drawing Sheets

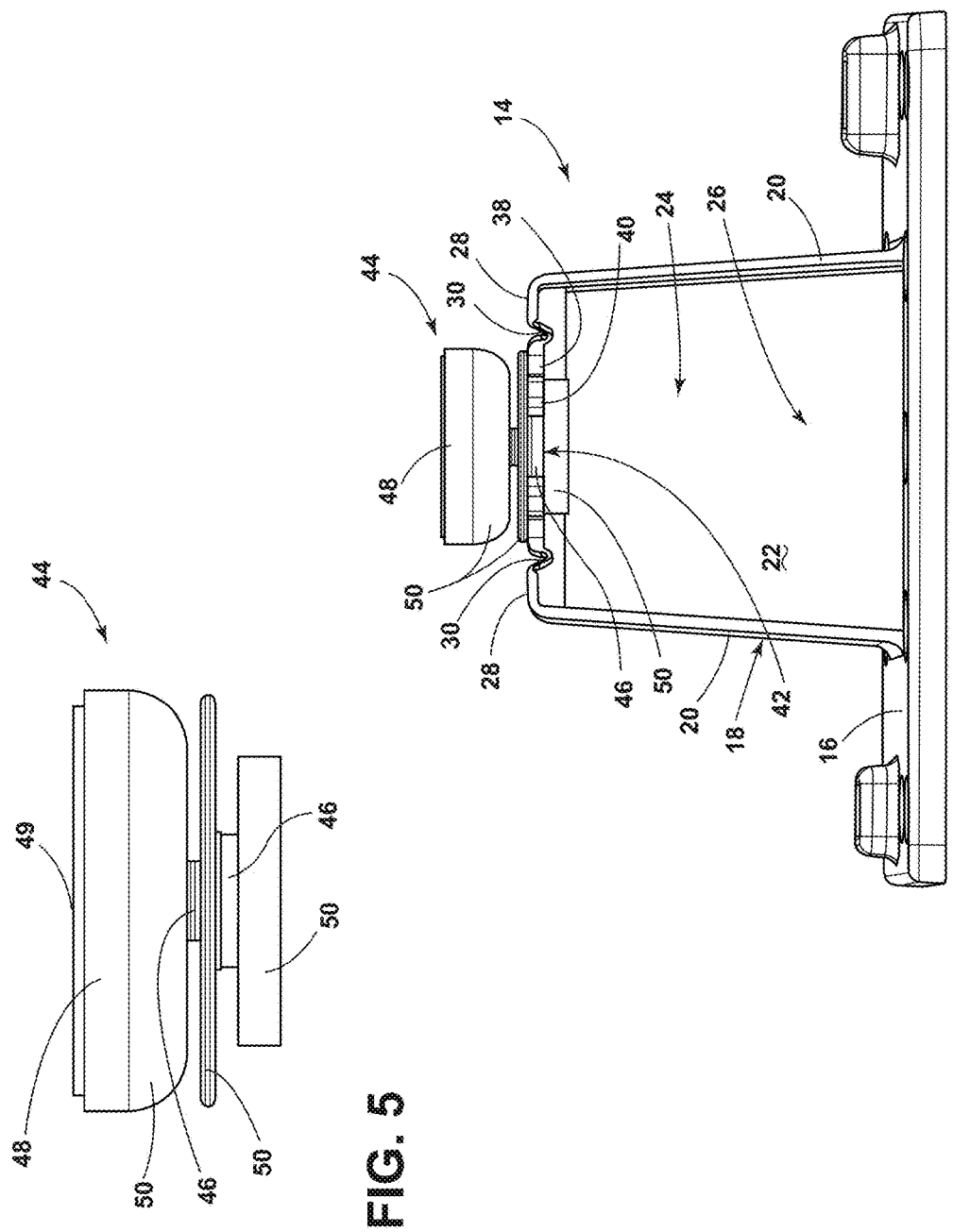

ADAPTABLE RETAINER

FIELD OF THE INVENTION

The present disclosure generally relates to vehicle interior substrate attachment assemblies, and more particularly to retainer-fastener assemblies.

BACKGROUND OF THE INVENTION

Curvature within vehicle interiors may create variable distances between vehicle substrates that are to be attached to one another. Accordingly, attaching vehicle substrates with a one-size fits all fastener-retainer may be challenging.

SUMMARY OF THE INVENTION

According to one aspect of the present disclosure, a vehicle interior substrate attachment system includes a fastener coupled to a roof substrate. A retainer is coupled to the fastener and includes a base, a body extending from the base, and an engagement platform defining a receiver to receive the fastener coupled to the body by a hinge feature. The hinge feature is configured to articulate such that the engagement platform is operable between a first position and a second position that is further from the base than the first position. A liner substrate is coupled to the base of the retainer.

Embodiments of the first aspect of the invention can include any one or a combination of the following features:
 the fastener comprises a magnet;
 the hinge feature comprises a first articulable portion coupled to the body of the retainer, a leaf coupled to the first articulable portion, and a second articulable portion coupled to the leaf and the engagement platform of the retainer;
 the engagement platform is further operable between the second position and a third position that is closer to the base than the first position;
 the base, the body, the hinge feature, and the engagement platform are integrally coupled; and
 the body defines a cavity.

According to another aspect of the present disclosure, an attachment assembly includes a retainer. The retainer includes a base, a body extending from the base, and an engagement platform coupled to the body by a hinge feature. A first substrate is coupled to the base of the retainer. A fastener is coupled to the engagement platform of the retainer. A second substrate is coupled to the fastener.

Embodiments of the second aspect of the invention can include any one or a combination of the following features:
 the fastener comprises a magnet;
 the body, the hinge feature, and the engagement platform are integrally coupled;
 the hinge feature comprises a living hinge;
 the hinge feature comprises a plurality of hinge features; and
 the body defines a cavity.

According to yet another aspect of the present disclosure, a retainer for receiving a fastener includes a base. A body extends from the base. An engagement platform that defines a receiver is coupled to the body by a hinge feature and operable between a first position and a second position in which the engagement platform is further from the base than the first position.

Embodiments of the third aspect of the invention can include any one or a combination of the following features:
 the engagement platform is generally rigid;
 the body is generally rigid;
 the hinge feature comprises a plurality of hinge features;
 the engagement platform includes an retention surface, and the retention surface in the first position is about parallel to the retention surface in the second position;
 the engagement platform is further operable between the second position and a third position that is closer to the base than the first position;
 the engagement platform is in equilibrium while in the first position; and
 the body, the hinge feature, and the engagement platform are integrally coupled.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5 is a front elevation view of the fastener, according to one embodiment;

FIG. 6 is a front elevation view of the fastener coupled to the retainer, according to one embodiment;

DETAILED DESCRIPTION OF THE PREFERRED EMBODIMENTS

Figure 1:
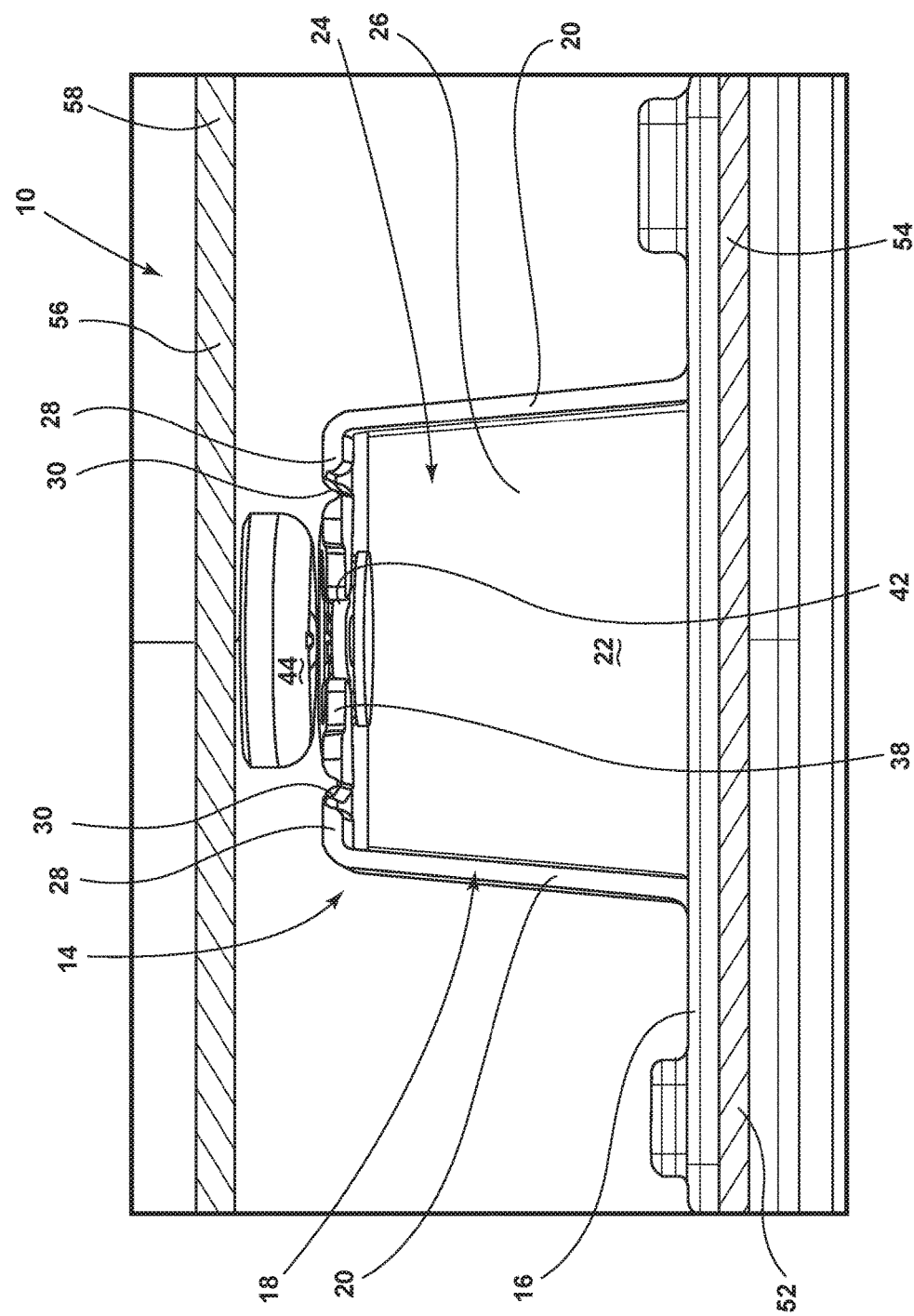
FIG. 1 is a partial sectional side view of a retainer and a fastener connecting a first and second substrate, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-7C, a vehicle 10 has a roof substrate 58. A fastener 44 is coupled to the roof substrate 58. A retainer 14 is coupled to the fastener 44 and includes a base 16, a body 18 extending from the base 16, and an engagement platform 38 that defines a receiver 42 for receiving the fastener 44, coupled to the body 18 by a hinge feature 30. The hinge feature 30 is configured to articulate such that the engagement platform 38 is operable between a first position and a second position that is further from the base 16 than the first position. A liner substrate 54 is coupled to the base 16 of the retainer 14.

Figure 2:
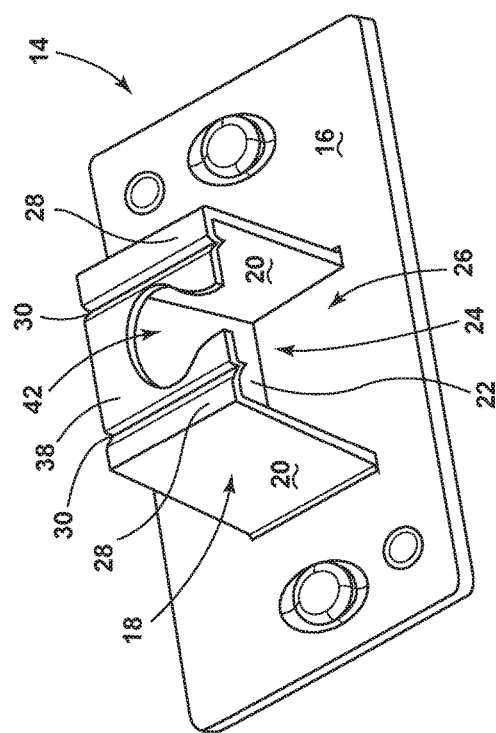
FIG. 2 is a front elevational view of the of the retainer, according to one embodiment.

Referring now to FIG. 2, the retainer 14 is depicted. As mentioned above, the retainer 14 may include the base 16, the body 18, the hinge feature 30, and the engagement platform 38. In various embodiments, the body 18 may be coupled to the base 16. In some embodiments, the body 18 may be integrally coupled with the base 16. In various embodiments, the body 18 may extend from the base 16 in a direction away from the base 16. In some embodiments, the body 18 may extend from the base 16 in a direction that is about perpendicular to the base 16. In various embodiments, the body 18 may be generally rigid and may be made of at least one of a host of materials that includes, but is not limited to, plastic, polymeric materials, natural materials, metal, rubber, resins, and/or a combination thereof. It is contemplated that, in some embodiments, the body 18 may be made of any suitable material.

In some embodiments, the body 18 may include a plurality of side walls 20. The plurality of side walls 20 may be positioned opposite one another. As further depicted in FIG. 2, in some embodiments, the body may include an end wall 22. The end wall 22 may be coupled to the plurality of side walls 20. It is contemplated that, in some embodiments, the body 18 may include a plurality of end walls 22

In various embodiments, the body 18 may define a cavity 24. In some embodiments, the side walls 20 may partially define an opening 26 to the cavity 24. The side walls 20 may indicate the lateral bounds of the cavity 24. In some embodiments, the end wall 22 may indicate a longitudinal boundary of the cavity 24. The end wall 22 may be opposite of the opening 26 of the cavity 24.

In some embodiments, the body 18 may include one or more shelves 28. In some embodiments the one or more shelves 28 may extend retainer-inbound from the body 18. In some embodiments, the one or more shelves 28 may extend from the plurality of side walls 20. In some embodiments the one or more shelves 28 may extend from the end wall. In some embodiments, the one or more shelves 28 may extend from the plurality of side walls 20 and the end wall 22. The one or more shelves 28 may extend above the cavity 24. In some embodiments, the one or more shelves 28 may extend in a generally perpendicular direction relative to the at least one of the plurality of side walls 20 and/or the end wall 22. In some embodiments, the one or more shelves 28 may be generally parallel to the base 16.

Figure 3:
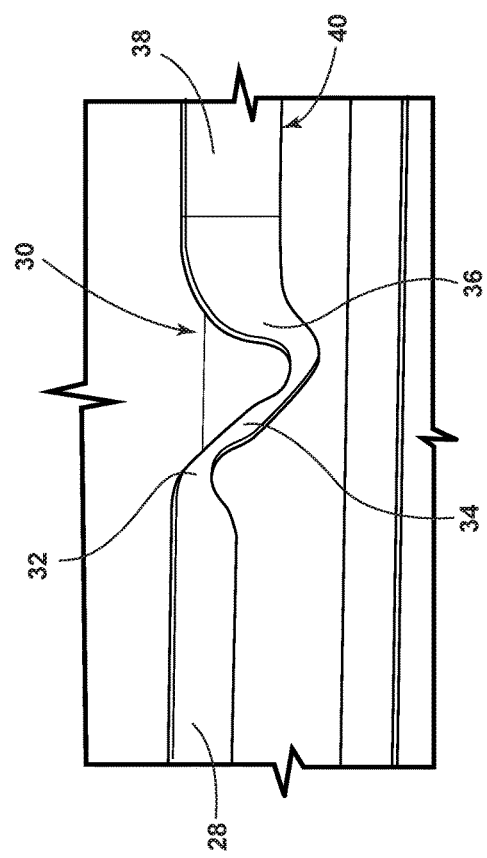
FIG. 3 is an enlarged front view of a hinge feature of the retainer, according to one embodiment.

Referring now to FIGS. 2 and 3, the retainer 14 may include the hinge feature 30. In various embodiments, the hinge feature 30 may be coupled to the body 18. In some embodiments, the hinge feature 30 may be coupled to the plurality of side walls 20 and/or the end wall 22. In some embodiments, the hinge feature 30 may be coupled to the one or more shelves 28. In some embodiments, the hinge feature 30 may be integrally coupled with the body of the retainer 14. It is contemplated that the hinge feature 30 may include a plurality of hinge features 30. For example, in some embodiments, one of the plurality of hinge features 30 may be coupled to one of the plurality of side walls 20, and another one of the plurality of hinge features 30 may be coupled to another one of the plurality of side walls 20, as shown in FIG. 2.

The hinge feature 30 may be configured to articulate. In other words, the hinge feature 30 may be configured to flex, pivot, bend, swivel, hinge, rotate, turn, and/or do a combination of those actions. The hinge feature 30 may include a variety of mechanisms configured to articulate (e.g., hinge, mechanical pivot joint, etc.). In some embodiments, the hinge feature 30 may include a living hinge. As shown in FIG. 3, in some embodiments, the hinge feature 30 may include (1) a first articulable portion 32 coupled to the body 18, the plurality of side walls 20, the end wall 22 and/or the one or more shelves 28 of the retainer 14, (2) a leaf 34 coupled to the first articulable portion 32, and (3) a second articulable portion 36 coupled to the leaf 34. The leaf 34 may be disposed between the first articulable portion 32 and the second articulable portion 36.

Referring now to FIG. 2, the retainer 14 may include the engagement platform 38. In various embodiments, the engagement platform 38 may be coupled to the hinge feature 30. In some embodiments, the engagement platform 38 may be integrally coupled with the hinge feature 30. In some embodiments, the engagement platform 38 may be coupled to the second articulable portion 36 of the hinge feature 30. As shown in FIG. 2, in some embodiments, the engagement platform 38 may be coupled to the plurality of hinge features 30. In various embodiments, the engagement platform 38 may be generally rigid and may be made of at least one of a host of materials that includes, but is not limited to, plastic, polymeric materials, natural materials, metal, rubber, resins, and/or a combination thereof. It is contemplated that, in some embodiments, the engagement platform 38 may be made of any suitable material. The engagement platform 38 may include a retention surface 40. In some embodiments, the retention surface 40 may be on the underside of the engagement platform 38 relative to the base 16. In other words, the retention surface 40 may face the base 16 of the retainer 14.

In various embodiments, the engagement platform 38 may include the receiver 42 which may be configured to receive the fastener 44, which will be discussed in more detail in subsequent paragraphs. In some embodiments, the receiver 42 may include a recess in the engagement platform 38. In some embodiments, the receiver 42 may include an aperture in the engagement platform 38. It is contemplated that the receiver 42 may include a variety of features configured to receive the fastener 44.

Figure 4A:
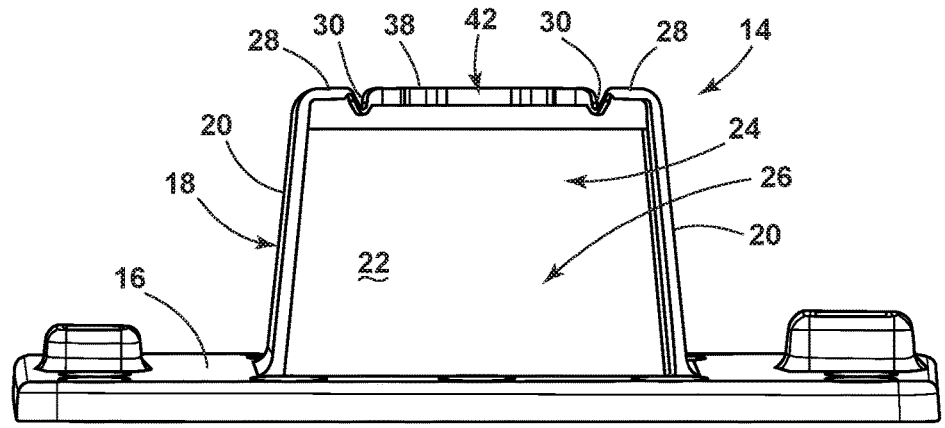
FIG. 4A is a front elevational view of the retainer, illustrating an engagement platform in a first position, according to one embodiment.
Figure 4B:
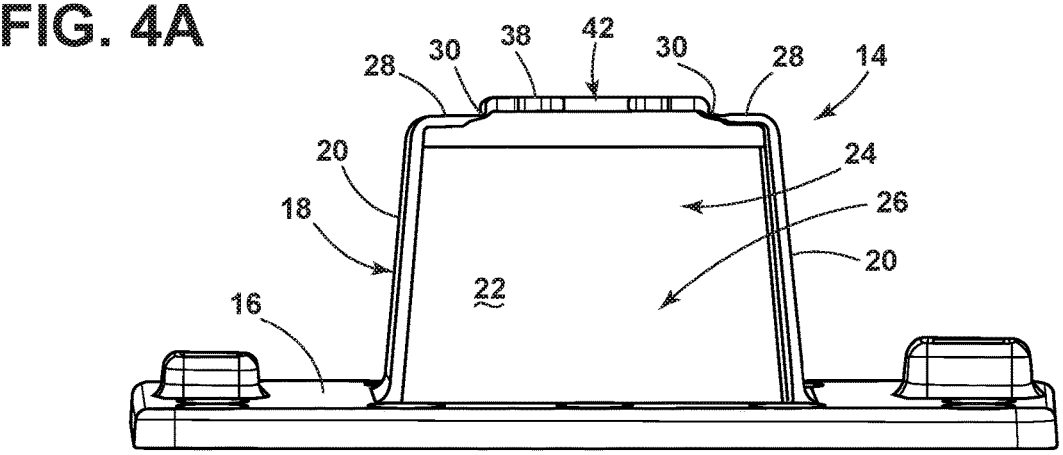
FIG. 4B is a front elevational view of the retainer illustrating the engagement platform in a second position, according to one embodiment.
Figure 4C:
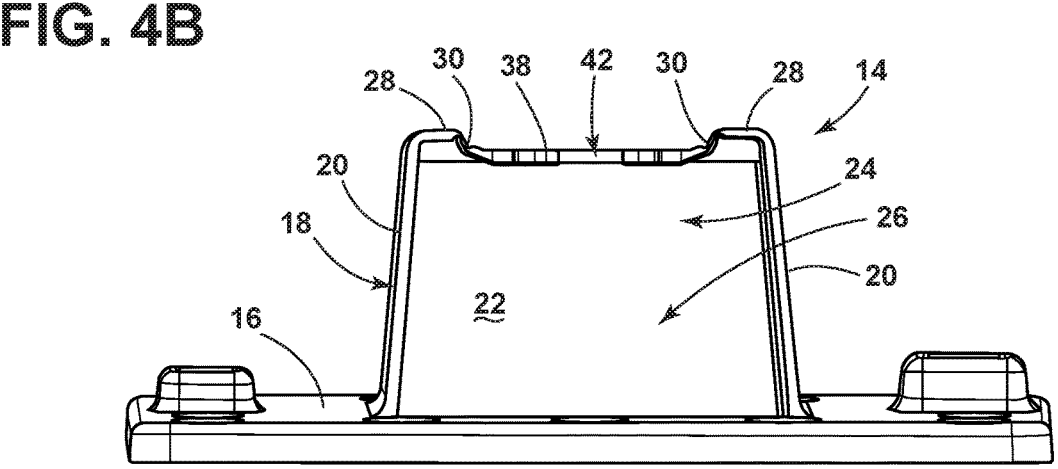
FIG. 4C is a front elevational view of the retainer illustrating the engagement platform in a third position, according to one embodiment.

In reference to FIGS. 4A-4C, the engagement platform 38 may be operable between a plurality of positions. In various embodiments, the engagement platform 38 may be operable between a first position and a second position that is further from the base 16 than the first position. In other words, the engagement platform 38 is closer to the base 16 of the retainer 14 while in the first position relative to the position of the engagement platform 38 while the engagement platform 38 is in the second position. Accordingly, the engagement platform 38 is further from the base 16 of the retainer 14 in the second position relative to the position of engagement platform 38 while the engagement platform 38 is in the first position. In some embodiments, the engagement platform 38 may be further operable to a third position in which the engagement platform 38 is closer to the base 16 than the position of the engagement platform 38 when the engagement platform 38 is in the first position. Thus, in some embodiments, the first position may be disposed between the second position and the third position.

The engagement platform 38 may move between positions by articulation of the hinge features 30 coupling the engagement platform 38 to the body 18. For example, upon the application of a force to the engagement platform 38 toward the base 16 of the retainer 14, the hinge features 30 may articulate to allow the engagement platform 38 to move from the second position towards the base 16 to the first and/or third position. Further, upon an application of a force to the engagement platform 38 away from the base 16 of the retainer 14, the hinge feature 30 may articulate to allow the engagement platform 38 to move from the third position away from the base 16 to the first position and/or second position.

In some embodiments, the engagement platform 38 may be in equilibrium while in the first position. In other words, the engagement platform 38 may be at rest while in the first position if it is not being influenced by the force of the fastener 44, or other object exterior to the retainer 14. It is contemplated that, in some embodiments, the engagement platform 38 may be in equilibrium in multiple positions. In some embodiments, the hinge feature 30 may bias the engagement platform 38 towards the first position while the engagement platform 38 is in the second position and/or the third position.

In some embodiments, the engagement platform 38 may be about planar to the one or more shelves 28 of the body 18 of the retainer 14 while in the first position. In some embodiments, the engagement platform 38 may be in equilibrium while generally planar with the one or more shelves 28. In some embodiments, the engagement platform 38 may be generally parallel with the base 16 while in the first position, the second position, and/or the third position. In some embodiments, the retention surface 40 may be about parallel to the base 16 while the engagement platform 38 is in the first position, the second position, and/or the third position. In some embodiments, while the engagement platform 38 is in the first position, the retention surface 40 may be about parallel to the retention surface 40 of the engagement platform 38 while the engagement platform 38 is in the second position and/or the third position.

Referring now to FIG. 5-6, in various embodiments, the fastener 44 may be coupled to the retainer 14. In various embodiments, the fastener 44 may be coupled to the engagement platform 38. In some embodiments, the fastener 44 may be disposed within and/or able to be placed within the receiver 42. It is contemplated that the fastener 44 may be at least one of a host of known features configured to fasten including, but not limited to, a Christmas tree fastener, a bolt, an adhesive, a magnet, a hook and loop system, push-type fastener, a pin, a clip, a screw, and/or a combination thereof.

As depicted in FIG. 5, in some embodiments, the fastener 44 may include a shaft 46, a substrate attachment element 48 configured to attach to a substrate, such as the roof substrate 58, and at least one retention element 50 configured to engage with engagement platform 38. The substrate attachment element 48 may be attached to the shaft 46 and/or disposed around the shaft 46. In some embodiments, the substrate attachment element 48 may include a magnet 49 that may magnetically attach onto a metal surface of the roof substrate 58. The at least one retention element 50 may be attached to the shaft 46 and/or disposed around the shaft 46. In some embodiments, the at least one retention element 50 may include a flange. It is contemplated that the at least one retention element 50 may include a variety of features (e.g., tabs, skirts, etc.). The at least one retention element 50 may be configured to engage with the engagement platform 38 and/or the retention surface 40 of the engagement platform 38 such that the fastener 44 may be held within the receiver 42. In some embodiments, the at least one retention element 50 may be about flush with the retention surface 40 while engaged with the retention surface 40. In some embodiments, the shaft 46 may be directed generally perpendicular to the base 16, the engagement platform 38, and/or the retention surface 40 while the shaft 46 is disposed within the receiver 42 and/or the at least one retention element 50 is engaged with the retention surface 40 of the engagement platform 38.

Figure 7A:
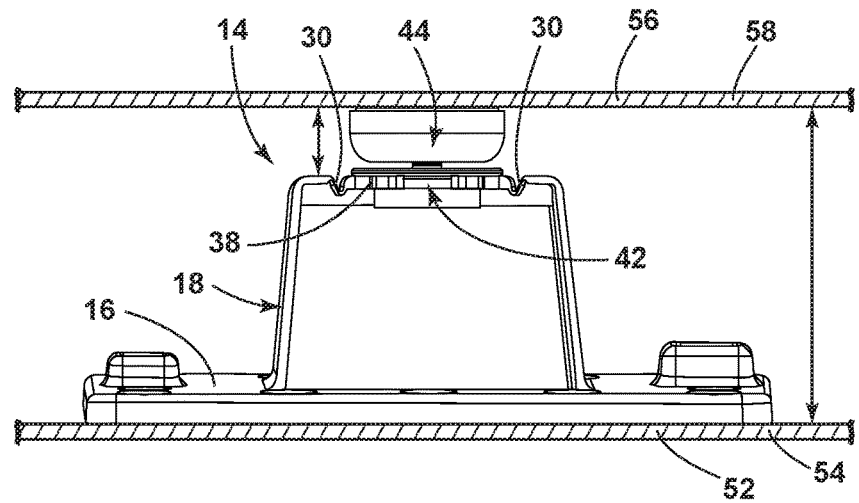
FIG. 7A is a front elevation view of the retainer and the fastener connecting the first substrate to the second substrate, illustrating the engagement platform in the first position, according to one embodiment.

Referring now to FIG. 7A, a first substrate 52 may be coupled to the retainer 14. In some embodiments, the first substrate 52 may be coupled to the base 16 of the retainer 14. In some embodiments, the first substrate 52 may be integrally coupled with the retainer 14. It is contemplated that the first substrate 52 may be coupled to the retainer 14 by a variety of features (e.g., adhesive, magnets, clips, screws, pins, etc.). The first substrate 52 may be composed of at least one of a host of materials including, but not limited to, metal, rubber, fabric, natural materials, textiles, plastic, and/or a combination thereof. In some embodiments, the first substrate 52 may include the liner substrate 54 that is configured for use in vehicle 10 interiors. In some examples the liner substrate 54 may include a headliner of a vehicle 10. It is contemplated that the first substrate 52 may be any suitable vehicle 10 substrate. It is further contemplated that the first substrate may be a variety of non-vehicular substrates.

Further referring to FIG. 7A, a second substrate 56 may be coupled to the fastener 44. In some embodiments, the second substrate 56 may be coupled to the substrate attachment element 48 of the fastener 44. In some embodiments, the second substrate 56 may be integrally coupled with the fastener 44. It is contemplated that the second substrate 56 and the fastener 44 may be coupled by the fastening means of the fastener 44. For example, if the fastener 44 includes the magnet 49, the fastener may be coupled to the second substrate 56 by the force of the magnet 49 attracted to a metal ferromagnetic material. The second substrate 56 may be composed of at least one of a host of materials including, but not limited to, metal, rubber, fabric, natural materials, textiles, plastic, and/or a combination thereof. In some embodiments, the second substrate 56 may include the roof substrate 58 that is configured to provide a roof for a vehicle 10. In some examples, the roof substrate 58 may be metal and/or magnetic. It is contemplated that the second substrate 56 may any suitable vehicle substrate. It is further contemplated that the second substrate 56 may be a variety of non-vehicular substrates.

Figure 7B:
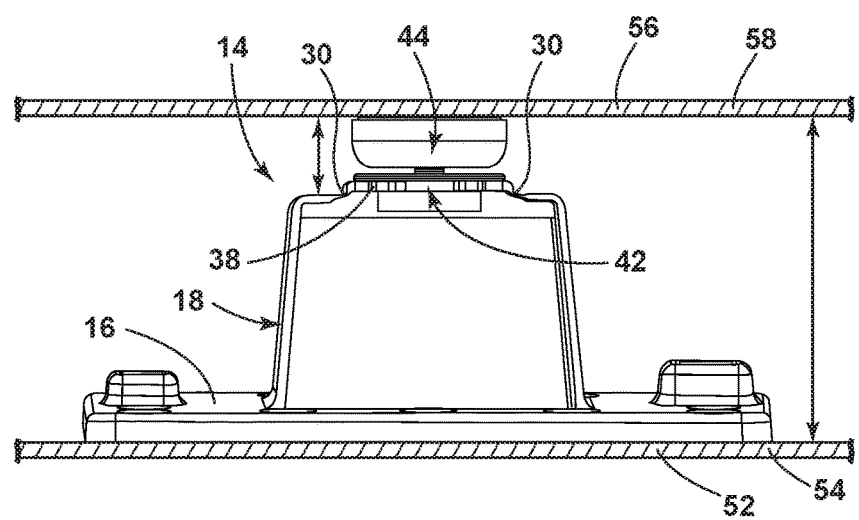
FIG. 7B is a front elevation view of the retainer and the fastener connecting the first substrate to the second substrate, illustrating the engagement platform in the second position, according to one embodiment.
Figure 7C:
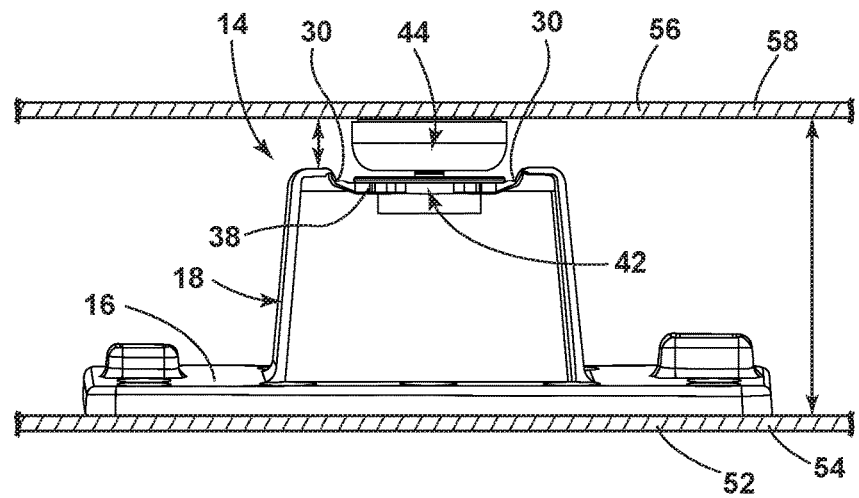
FIG. 7C is a front elevation view of the retainer and the fastener connecting the first substrate to the second substrate, illustrating the engagement platform in the third position, according to one embodiment.

Use of the present disclosure may provide a variety of advantages. First, the operability of the engagement platform 38 between various positions may allow the retainer 14 and the fastener 44 to be coupled to the first substrate 52 and the second substrate 56 at varying distances from one another as depicted in FIGS. 7A-7C. Second, the operability of the engagement platform 38 between various positions may increase the ease of connecting the first substrate 52 to the second substrate 56.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle interior substrate attachment system, comprising:
   a roof substrate;
   a fastener coupled to the roof substrate;
   a retainer coupled to the fastener, comprising:
      a base;
      a body extending from the base; and
      an engagement platform that defines a receiver to receive the fastener, coupled to the body by a hinge feature, wherein the hinge feature comprises a living hinge and is configured to articulate such that the engagement platform is operable between a first position and a second position that is further from the base than the first position; and
   a liner substrate coupled to the base of the retainer.

2. The vehicle interior substrate attachment system of claim 1, wherein the fastener comprises a magnet.

3. The vehicle interior substrate attachment system of claim 1, wherein the hinge feature comprises:
   a first articulable portion coupled to the body of the retainer;
   a leaf coupled to the first articulable portion; and
   a second articulable portion coupled to the leaf and the engagement platform of the retainer.

4. The vehicle interior substrate attachment system of claim 1, wherein the engagement platform is further operable between the second position and a third position that is closer to the base than the first position.

5. The vehicle interior substrate attachment system of claim 1, wherein the base, the body, the hinge feature, and the engagement platform are integrally coupled.

6. The vehicle interior substrate attachment system of claim 1, wherein the body defines a cavity.

7. An attachment assembly, comprising:
   a retainer, comprising
      a base;
      a body extending from the base; and
      an engagement platform coupled to the body by a hinge feature;
   a first substrate coupled to the base of the retainer;
   a fastener coupled to the engagement platform of the retainer; and
   a second substrate coupled to the fastener, wherein the hinge feature comprises a living hinge.

8. The attachment assembly of claim 7, wherein the fastener comprises a magnet.

9. The attachment assembly of claim 7, wherein the body, the hinge feature, and the engagement platform are integrally coupled.

10. The attachment assembly of claim 7, wherein the hinge feature comprises a plurality of hinge features.

11. The attachment assembly of claim 7, wherein the body defines a cavity.

* * * * *